United States Patent [19]
Russell

[11] Patent Number: 5,152,955
[45] Date of Patent: Oct. 6, 1992

[54] STORAGE RING FUSION ENERGY GENERATOR

[76] Inventor: Joseph A. Russell, 600 Star Rte., Lompoc, Calif. 93436

[21] Appl. No.: 566,054

[22] Filed: Aug. 9, 1990

[51] Int. Cl.$^5$ ............................................. G21B 1/02
[52] U.S. Cl. ................................. 376/107; 376/146; 376/147
[58] Field of Search ..................... 376/107, 146, 147

[56] References Cited

U.S. PATENT DOCUMENTS

| | | | |
|---|---|---|---|
| 2,979,635 | 4/1961 | Burleigh | 376/107 |
| 3,120,475 | 2/1964 | Bennet | 376/107 |
| 3,120,476 | 2/1964 | Post | 376/132 |
| 3,343,020 | 9/1967 | Gordon | 376/107 |
| 3,344,357 | 9/1967 | Blewett | 376/107 |
| 3,386,883 | 6/1968 | Farnsworth | 376/107 |
| 3,655,508 | 4/1972 | Hirsch | 376/146 |
| 3,664,920 | 6/1972 | Hirsch | 376/107 |
| 4,069,457 | 1/1978 | Martin et al. | 376/108 |
| 4,189,346 | 2/1980 | Jarnagin | 376/107 |
| 4,202,725 | 5/1980 | Jarnagin | 376/107 |
| 4,390,494 | 6/1983 | Salisbury | 376/107 |
| 4,390,495 | 6/1983 | Salisbury | 376/120 |
| 4,397,809 | 8/1983 | Salisbury | 376/107 |
| 4,397,810 | 8/1983 | Salisbury | 376/107 |
| 4,416,845 | 11/1983 | Salisbury | 376/107 |
| 4,434,130 | 2/1984 | Salisbury | 376/107 |
| 4,650,630 | 3/1987 | Boyer | 376/107 |
| 4,788,024 | 11/1988 | Maglich et al. | 376/107 |
| 4,826,646 | 5/1989 | Bussard | 376/107 |
| 4,853,173 | 8/1989 | Stenbacka | 376/107 |
| 5,034,183 | 7/1991 | Blewett | 376/107 |

OTHER PUBLICATIONS

McGraw-Hill Encyclopedia of Physics (1983) pp. 720, 721, 778, 1013, 1265.
Waldemar H. Scharf, "Particle Accelerators–Applications in Technology and Research" (1989), pp. 123, 587, 589.
"Van Nostrand's Scientific Encyclopedia, Fifth Edition" (1976), pp. 13-18.
Lerner & Trigg "Encyclopedia of Physics" (1981) pp. 109-111, 260-261, 269, 577-579, 1025.
Wehr and Richards, "Physics of the Atom, Second Edition" (1967) pp. 469-471.
"Hot Fusion: A Meltdown In Political Support," Science, vol. 247, pp. 1534-1535, Mar. 30, 1990.
L. E. Murr, "Electron and Ion Microscopy and Microanalysis" (1982) pp. 94-99, 103.
Cestmir Simane, EIE, "Accelerators of Ions and Electrons" pp. 78-80.
M. M. El-Wakil, "Nuclear Energy Conversion" (1982) pp. 545-549, 553-555.
"An Introduction To Controlled Thermonuclear Fusion" by M.O. Hagler and M. Kristiansen (1977) pp. 6-7.
"Controlled Thermonuclear Reactions" by Glasstone and Loveberg (1960) p. 67.
"Nuclear Fusion" by William P. Allis (1960) pp. 1-2.

Primary Examiner—Daniel D. Wasil
Attorney, Agent, or Firm—Lowell R. Wedemeyer

[57] ABSTRACT

This invention relates to adaptation of intersecting storage rings, of the same type used in high energy nuclear physics research, for power generation. The device is optimized for lower-energy beam paricles and higher beam current, adapted with a reaction chamber at the intersection of the rings to collect released fusion energy for conversion to electricity, and equipped with means to recapture scattered accelerated particles and reintegrate them into the focused beams for recirculation through the reaction chamber. The preferred beam particles, deuterium and tritium, are accelerated and injected into and focused by the storage rings, to collide nearly head on in the reaction chamber. Non-colliding, accelerated beam particles are conserved by recovery, correction and recirculation, requiring relatively small amounts of input energy to maintain acceleration and focus of the beams, and thus remain energized for another collision attempt. Grid devices intercept scattered particles and recapture some of them for recirculation. Only those beam particles which scatter so widely as to evade recapture and those which actually react to produce thermonuclear fusion mush be replaced and accelerated up to the energy sufficient to cause fusion.

8 Claims, 3 Drawing Sheets

STORAGE RING FUSION ENERGY GENERATOR

BACKGROUND OF THE INVENTION

1. Field of the Invention

The field of the invention is devices and methods for generating and collecting energy from fusion reactions.

2. Summary of the Invention

This invention relates to adaptation of intersecting storage rings, of the same type used in high energy nuclear physics research, to produce and collect energy for use in power generation. The device is optimized for lower-energy beam particles and higher beam current, adapted with a reaction chamber at the intersection of the rings to collect released fusion energy for conversion to electricity, and equipped with means to recapture scattered accelerated particles and reintegrate them into the focused beams for recirculation through the reaction chamber.

3. Related Art

It is known that certain isotopes of hydrogen, when caused to collide with sufficient energy, will fuse to form helium. This releases substantial amounts of energy. Some examples of these reactions listed in Ref. 1 pp. 720 are as follows.

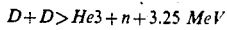

$D+D > He3 + n + 3.25\ MeV$

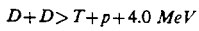

$D+D > T + p + 4.0\ MeV$

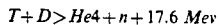

$T+D > He4 + n + 17.6\ Mev$

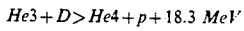

$He3 + D > He4 + p + 18.3\ MeV$

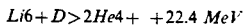

$Li6 + D > 2He4 + \ +22.4\ MeV$

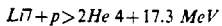

$Li7 + p > 2He4 + 17.3\ MeV$

REACTION #3 is the easiest to promote since it requires the lowest accelerated-particle energy (about 110 KEV) and has the highest cross section (about 5 barns). See FIG. 7. As indicated, where the reactants are tritium and deuterium the products include one Helium 4 nucleus, one neutron, and about 17.6 MEV of energy.

Numerous methods have been developed over the years to produce the conditions of high energy required to promote a self-sustaining thermonuclear reaction for the purpose of producing electric power.

Government projects have concentrated primarily on producing and confining plasmas (gas heated to a temperature or energy sufficient to cause the electrons to be pulled out of their orbits around the nucleus) to produce fusion. The confinement has been either of a magnetic nature, relying on the electrical conductivity of plasma, or of an inertial nature, relying on an intense laser or ion beam to rapidly heat a small fuel pellet causing it to implode. Either method results in an environment where some hydrogen nuclei will collide with each other with enough energy to fuse into helium. However, these projects have entailed enormous, continuing research and development investments in efforts to elucidate new principles of physics and to invent new devices to achieve net energy output. These projects are still attempting to reliably achieve break-even net energy balances and there is no assurance as to when, if ever, these technologies will enable reliable net energy production. Ref. 6.

Several ion colliders have been developed and are referenced below. Salisbury, Hirsch and Farnsworth rely on electrostatic confinement. Jarnagin, Post, Bennett and Maglich use magnets to bend the trajectories of the ions.

If ions are accelerated from rest to a high energy but pass through only a single intersection of opposing beams where they have an opportunity for a collision, most accelerated ions will fail to collide and the energy expended to accelerate them will be wasted, thus defeating net energy production. The energy expenditure for initial acceleration can be conserved by recirculation of the accelerated particles in intersecting storage rings for additional collision opportunities.

Hayden S. Gordon invented the intersecting storage ring device for causing atomic nuclei to collide head on and recirculating the un-reacted particles with reduced loss of un-reacted particles and resulting savings of input energy. U.S. Pat. No. 3,343,020, by Gordon, 1967. In Gordon's device nuclei are directed around one ring in one direction through an evacuated pipe with appropriate magnets to bend the paths of the nuclei and other magnets and electrodes to focus the beams of nuclei and insure that they have the correct energy. A second ring is provided to send another beam in the opposite direction. There is at least one spot where the two rings intersect. When beams of atomic nuclei collide nearly head on in the intersecting storage rings, a large percentage of the combined energy of both beams is available to cause nuclear reaction. Intersecting storage rings in one form or another have become an important tool for high energy particle research. They have also become important as intensive neutron sources according to Ref. 2 pp. 123.

At the intersection of opposing beams of accelerated particles, ions that closely approach each other without collision, the 'near misses', are mutually repelled by the electrostatic charge and are scattered over a large range of angles. When equations 1 through 6, which are based on Ref. 1 and 5, are solved for angles of closest approach between 0 and 90 degrees, Table 1 is the result. It lists the relative probability of elastic scattering as a function of the angle of scatter for deuterium by tritium at 110 KEV.

Storage rings can be adjusted to maximize collisions between bunches of deuterons and tritons, but still most of the particles will miss each other altogether, and some near-misses will be scattered. It is important to recapture as high a percentage of scattered particles as possible in order to conserve the input energy used to accelerate them. Those which are recaptured can be reintegrated into bunches with less incremental energy input than was necessary to initially accelerate them from rest. Those which are deflected so much that they cannot be recaptured must be replaced, with total loss of the input energy used to accelerate them.

Storage ring improvements have been developed to recapture some of the scattered accelerated ions and to refocus the recirculating beams which are degraded during passage through the reaction zone. Ref. 1 pp. 778 describes electrostatic and magnet lens systems arranged alternately positive and negative (in the sense of convex and concave optical elements) so that, as in the optical analog, they have a net- and strong-focusing action on charged particle beams. The most frequent appearance of such lens systems is in the form of quadrupole (four-pole) or hexapole (six-pole) magnets used as variable-focal-length, variable-astigmatism elements in beam transport both within large accelerators themselves and in extensive systems external to the accelerator.

The storage rings can be fitted with quadrupole magnets to compress the beams to a smaller diameter. Ref. 1 pp. 788. These focusing magnets also aid recapture of scattered particles.

The storage ring maintenance accelerators keep the bunches from spreading out along the axis of travel.

The hot walls of the reaction chamber will tend to emit electrons into the chamber through the process of thermionic emission. The emitted electrons would tend to obstruct the beams of deuterium and tritium. They may even be captured by nuclei in these fast moving beams. There are several ways to mitigate these thermionic emission effects. One is to install a grid inside the chamber which would be constructed out of hollow tubes. A coolant is pumped through the tubes to keep them cool, even in the very hot environment of a thermonuclear reaction chamber. The grid is negatively charged several hundred volts. This repels the electrons emitted by the walls of the chamber back toward those same walls. See FIG. 4. This is analogous to the electron tubes described in Ref. 4 pp. 261. The triode tube has a hot cathode at its center with a grid surrounding it. A plate or anode surrounds the grid. When a positive voltage is applied to the anode, electrons which are emitted by the hot cathode flow to the anode. If a voltage that is negative with respect to the cathode is then applied to the grid, the flow is reduced. If a large enough negative voltage is applied, the flow is stopped altogether. The inside walls of the reaction chamber, which will be hot, are analogous to the hot cathode. The grid in the triode is analogous to the grid in the reaction chamber, and the anode in the triode is analogous to the positive ions in the ion beams.

Devices have been developed to collect heat and kinetic energy from fusion reactions for conversion into electricity. These include the use of working fluids which absorb thermal energy and transfer it to steam turbines, impact targets which absorb kinetic energy and convert it to thermal energy, and other devices described in Ref. 9 pp. 545-549.

Reaction chambers have been devised in which thermonuclear reactions take place and the resulting energy is converted into electricity, either directly as described in Ref. 9 pp. 553-555 or by capture in the form of heat for subsequent conversion into electricity as described in Ref. 9 pp. 548. However, the combination disclosed herein of intersecting storage rings with a thermonuclear reaction chamber adapted for electric power production is new. Intersecting storage rings as described in Ref. 2 pp. 123 are used as intense neutron sources, but not for power production.

Techniques for building electrostatic lenses and mirrors, described in Ref. 7 pp. 94-98 and 103, allow the ions that are scattered by a wide angle to be recaptured and reintegrated into the beams circulated by the intersecting storage rings. The combination described herein of such electrostatic lenses and mirrors with a thermonuclear reaction chamber adapted for electric power production in intersecting storage rings is new.

An improvement in fusion energy collection efficiency can be achieved by constructing the reaction chamber with one or more membranes and a target on the outside adapted to stop helium nuclei produced in the chamber. Ref. 9 pp. 553-555. See FIG. 6. The target is supported by insulators and a large positive static charge is allowed to build up on the target. When this charge builds to about 1.6 million volts it is bled off through power converter circuits of the type used on high voltage DC power transmission lines. As the Helium 4 nuclei, which each have two positively charged protons, move toward the positively charged target, they will slow down as they do work and give up energy. They will still hit the target with substantial kinetic energy, some of which can be converted directly into electricity. Ref. 9 pp. 553-555. Since these ions (HE4+) have passed through the metallic inner chamber wall of the reaction chamber before entering the space between said wall and the target said metallic wall will tend to shield the colliding beams of ions inside it from electrostatic distortion effects. The kinetic energy of the HE4+ ions is a significant fraction of the total energy released in the reaction chamber. If other energy released in the fusion reaction also is collected and is used in a thermal cycle, such as a steam turbine, then a significant fraction, perhaps up to 50%, of the fusion energy produced in the reaction chamber could be converted into electricity. If fuels which produce no neutrons were to be used (such as Helium 3 and deuterium), then the conversion rate potentially is even higher. However, the higher accelerated-particle energy necessary to cause these heavier nuclei to fuse is a significant disadvantage to use of these fuels.

Currently disclosed reactor designs do not provide for recapture of accelerated nuclei that are scattered with deflections greater than 90 degrees. The power amplification factor of the reactor can be improved substantially by recapturing some of the accelerated nuclei that are deflected by more than 90 degrees ('wrong-way ions') whose large deflection angles cause them to exit the reaction chamber through the 'wrong' exit pipe. Wrong-way ions mixed in with the proper ions that belong in a particular pipe when they pass through the accelerating electrodes, but the mass number of the wrong-way ions would differ from that of the ions properly in that pipe. At the first bending magnet the wrong-way ions would be lost because their mass-to-energy ratio would differ from that of the proper ions for which the bending magnets are adjusted so that such wrong-way ions would not be deflected by the same angle as the proper ions' beam pipe is bent to accommodate. Ref. 4 pp. 577-579. Wrong-way tritons, for example, would collide with the outer radius of the bent portion of the deuterium pipe. Similarly, wrong-way deuterons would collide with the inner radius of the tritium pipe. If, however, bypass pipes are provided to capture these wrong-way ions and send them back into the proper beam from whence they came in accord with this invention, the power amplification factor will be increased substantially.

REFERENCES CITED

U.S. Patent Documents 3,120,475, 2/1964, Bennett,
3,120,476, 2/1964, Post,
3,343,020, 9/1967, Gordon,
3,386,883, 6/1968, Farnsworth,
3,664,920, 6/1972, Hirsch,
4,189,346, 8/1983, Jarnagin,
4,390,494, 6/1983, Salisbury,
4,390,495, 6/1983, Salisbury,
4,397,809, 8/1983, Salisbury,
4,397,810, 8/1983, Salisbury,
4,416,845, 11/1983, Salisbury, 4,434,130, 2/1984, Salisbury,
4,788,024, 11/1988, Maglich et al.

OTHER PUBLICATIONS

1. "McGraw Hill Encyclopedia of Physics" (1983) pp. 1013, 720, 721, 1265, 778.
2. Waldemar H. Scharf "Particle Accelerators-Applications in Technology and Research" (1989) pp. 123, 587, 589.
3. "Van Nostrand's Scientific Encyclopedia, Fifth Edition" (1976) pp 13-18
4. Lerner and Trigg "Encyclopedia of physics" (1981) pp. 109-111, 269, 577-579, 260-261, 1025.
5. Wehr and Richards "Physics of the atom, second edition" (1967) pp. 469-471
6. "Hot Fusion: A Meltdown in Political Support," Science, Vol. 247, p. 1534-35, Mar. 30, 1990.
7. L. E. Murr, "Electron and Ion Microscopy and Microanalysis" (1982) pp. 94-99, 103.
8. Cestmir Simane, El. E. "Accelerators of Ions and Electrons" pp. 78-80
9. M. M. El-Wakil "Nuclear Energy Conversion" (1982) pp. 545-549, 553-555

OBJECTIVES AND ADVANTAGES OF THE INVENTION

One reason that fusion energy has failed to achieve commercial use is that inefficiencies in the energy generation and collection processes defeat excess energy production net of input energy requirements. The failure is a function among other things of high energy input requirements, dissipation of input energy through loss of particles which fail to fuse, and failure to efficiently collect released fusion energy. This invention is a new combination which improves the prospects for solving this problem.

It is an objective of this invention to combine for the first time the capacity of intersecting storage rings to induce fusion reactions in lower-energy particles with means for collecting the released energy, thereby adapting such rings for the first time to generate power.

It is an advantage of this invention that it adapts intersecting storage rings to collect both heat and kinetic energy produced by the fusion reaction for conversion into electricity, thus improving the efficiency of conversion of reactant products into forms collected for electricity generation.

It is an objective of this invention to combine (A) minimum input energy with (B) efficient conversion of accelerated particles to reactants and (C) efficient collection of released energy to improve the over-all efficiency of the energy production process.

It is an advantage of this invention that it combines (A) the low input energy of colliding particle beams, with (B) means for conserving un-reacted, accelerated particles to achieve a higher percentage of fusion of accelerated particles, and with (C) means for collecting a high percentage of released energy for conversion into electricity, thereby improving overall efficiency of the entire energy production process at low input energies.

It is a further advantage of this invention that it can employ a variety of reactants, and in particular can collide deuterium and tritium ions which are known to require the lowest accelerated particle energies to achieve fusion, while yielding a large theoretical energy production.

One reason that fusion energy has not achieved commercial use is that the available budgets are being strained by the enormous amounts of money and effort being devoted to develop new principles of physics and to test the feasibility of machines to implement these new principles. It is an objective of this invention to achieve energy production by new combinations of devices and methods already known to be feasible, thus avoiding the necessity for achieving breakthroughs in basic science and engineering, and avoiding investment in speculative fundamental research and development, thereby increasing the likelihood of commercial energy production and shortening the lead time to achieve commercial applications.

It is an advantage of this invention that it newly combines devices and methods, each of which taken separately is known to be feasible.

It is an objective of this invention to avoid wasting input energy which is used to initially accelerate particles to reaction energies.

It is an advantage of this invention that it conserves energized particles which fail to collide in passes through the reaction zone by recirculating them about storage rings for additional collision opportunities. It is a further advantage of this invention that it recaptures scattered accelerated particles over a wider range of scattering angles and redirects them into the proper storage rings for recirculation through the collision zone, thus reducing loss of the input energy used to initially accelerate scattered particles. It is a further advantage of this invention that it separates accelerated particles which have been deflected so widely that they are diverted into the 'wrong' beam pipe and redirects them back into the 'proper' beam pipe, thus conserving much of the input energy used to initially accelerate such 'wrong-way' accelerated particles.

It is an objective of this invention to combine the minimum input energy required to accelerate reactants with devices and methods for conserving that input energy by achieving reaction of a high percentage of the accelerated reactants and avoiding loss of un-reacted accelerated particles.

It is an advantage of this invention that it achieves fusion reactions more closely approaching theoretical optimum energies by employing intersecting storage rings, while recapturing significant percentages of accelerated particles which are scattered in the reaction chamber, thus saving them for recirculation through the reaction zone in order to react a higher percentage of the initially accelerated particles. This improves the net energy balance available to be collected for power generation.

A disadvantage of certain prior reactor designs, such as those of Salisbury for example, is that they maintain counter-rotating beams of accelerated ions in close proximity to each other for significant periods of time, thus subjecting such beams to dissipative and disruptive forces such as that described by Salisbury as 'two stream instability'. Salisbury, for example, employs extensive active and passive systems to mitigate such forces.

It is an advantage of this invention that it brings the counter-rotating beams of accelerated particles close together only at the intersection of the storage rings to minimize the exposure of the accelerated, focused particles to such dissipative and disruptive forces before they enter the collision zone. It is a further advantage of this invention that it passes un-reacted particles out of the collision zone and back into the storage rings after each pass through the collision zone for correction to optimum energy and trajectory before each recirculation through the collision zone. It is a further advantage of this invention that it separates the recovered counter-rotating beams of particles from each other which permits use of relatively more passive, less energy-intensive, simpler devices to recover and redirect unreacted particles. The invention's systems can be contrasted, for example, to the rather complex, active and passive systems disclosed by Salisbury to mitigate 'two stream instability' effects.

DISCLOSURE OF THE INVENTION

This invention pertains to the use of intersecting storage rings to recirculate opposing beams of accelerated deuterium and tritium nuclei for repeated collision opportunities in an energy-collecting reaction chamber. The opposing beams are focused in a small volume near the center of an evacuated reaction chamber to collide at an angle of about 15 degrees. Deuterons and tritons will be accelerated to their respective optimal energy ranges and forced into bunches (bunched). Two electrostatic injection accelerators are used to initially accelerate and inject the particles into the storage rings, one for deuterons and one for tritons. Magnetic accelerators or resonant cavities could also be used instead. Ref. 3 pp 15. Injection accelerators must introduce bunches of particles which are in phase with those already circulating in the storage ring; that is, add particles to existing bunches, not between bunches. The phases of counter-rotating bunches must be adjusted so that opposing bunches arrive simultaneously in the collision zone. The energy of the particles as they enter the storage rings should be sufficiently high to achieve reaction energy in collisions. Maintenance accelerators are installed in the storage rings to keep the particles bunched and to speed up particles which are slowed by passage through the reaction chamber, including recaptured scatters. They also will slow down any particles which are sped up by collision in the reaction chamber.

Provided that the recirculation and refocusing of the beams efficiently recaptures scattered particles and maintains focus of the non-colliding fraction of the accelerated beams, input energy required to achieve fusion reactions will be consumed principally in the injection accelerators. In that event, a relatively smaller amount of input energy will be required by the storage ring's maintenance accelerators, despite the fact that the current (number of particles) through the storage ring's maintenance accelerators will be greater than the current through the injection accelerators. This is because the bunches in the injection accelerators are being accelerated from rest to reaction energy, whereas the particle bunches in the storage ring maintenance accelerators will already be more nearly in phase with the optimum energy and bunch timing, with only some small fraction out of phase. The particles which are in phase are the particles referred to in Ref. 8 pp. 80 as being in phase with the potential wave and therefore not being accelerated.

As table 1 illustrates, a power plant employing the invention and reacting deuterium and tritium which recaptures 70% of the ions scattered by 85 degrees or less, would have a theoretical power gain of about 20 without wrong-way ion recovery. Power gain of about 40 will be achievable with wrong-way ion recovery, assuming recovery of 20% of the energy otherwise lost due to wrong-way ions. For example, a reactor operating in this manner and producing 100 megawatts of thermal energy could be coupled to a steam generator which would produce about 40 megawatts of electricity employing existing generator technology. Ref. 9 pp. 548. Approximately 5 megawatts would be required to accelerate the replacement particles without wrong-way ion recovery and 2.5 megawatts with it (in an ideal reactor and neglecting the energy required for recapture and maintenance of the beams), leaving about 35 megawatts theoretically available as net output power.

In practice, there would of course be maintenance energy input to achieve recirculation, inefficiencies of ion lenses and mirrors in the ion recovery system, as well as focusing inefficiencies, and a variety of resistance and other electrical loads which would reduce the net output power available for sale below the theoretically available power. However, a substantial improvement in thermonuclear reactor power gain would be achieved by this invention. No major advancements are required in thermal electric generators, particle accelerators, or special high power magnets, either superconducting or conventional. Neither do any new principles of physics need to be discovered. The characteristics of the nuclear reactions described here are well known and are taken from publicly available literature. Thus, one of the invention's most important advantages is that it is a new combination of existing technology and known physical science with a resulting higher probability of achieving early commercial application.

Equations and tables

Equations and tables are provided in this disclosure so that one skilled in the art may have a better understanding of the design concepts employed in the invention. Such skilled persons will recognize that the equations and tables used in this disclosure are generalized, not exact, and employ simplifications which neglect or fix a variety of variables experienced in real fusion reactions.

1) The distance of closest approach of one nucleus to another is given by Ref. 1 pp. 1013 as $d = Z_1 Z_2 e^2 / 4\pi\epsilon_0 E$ and is valid for all head on collisions.

2) Based upon geometric analysis, for collisions other than head on collisions, the term E is replaced by the term $(\sqrt{E} \cos \theta)$. For off axis collisions, the distance of closest approach as shown in FIG. 8 is $d = Z_1 Z_2 e^2 / \pi\epsilon_0 (\sqrt{E} \cos \theta)^2$, the values for the constants are as follows:

$Z_1$ and $Z_2$ are the number of charged particles in the target and projectile nucleus respectively and both have the value of 1.

e is the electronic charge and has a value of $4.8 \times 10^{-10} \text{ cm}^{3/2} \times \text{g}^{\frac{1}{2}} \times \text{s}^{-1}$ according to Ref.5 pp. 471.

$\epsilon_0$ is the permittivity of free space and has a value of $1/36\pi \times 10^9 \text{ F} \times \text{m}^{-1}$ accordinq to Ref. 5 pp. 469.

E is the total combined energy of collision and is 110 KEV.

3) The cross section for scattering of nuclei by a given angle or less as shown in FIG. 5 is $A_s = (\sin\theta \times d)^2 \times \pi$ and the scattering angle is equal to 180 deqrees $- 2 \times A$.

4) The ratio of ions scattered to ions reacting, assuming that all those which are deflected by less than an angle given in table 1 are captured and re bunched is $A_x / A_r$.

$A_r$ is given by Ref. 1 pp. 721 as 5 barns or $5 \times 10^{-28}$ meters² at 110 KEV.

5) The energy invested to produce a thermonuclear reaction is $E_i = 110 \text{ KEV} \times A_s/A_r$.

6) The power amplification factor of the reactor is therefore $P_f = 17.6 \text{ MEV}/110 \text{ KEV} \times A_s/A_r)$.

TABLE 1

When the above equations are solved for values of the angle of closest approach, theta ($\theta$), between 0 and 90 degrees, and the resulting values are tabulated, Table 1 is the result. As illustrated in FIG. 8, the angle of deflection 77 between a given particle's pre-action and post-action trajectories in an elastic scattering event (one which does not result in a thermonuclear reaction) is equal to 180 degrees minus twice the closest approach angle (theta) 75. The tabulation also shows corresponding distance of closest approach (d) and area of elastic scatter ($A_s$), the ratio of cross sectional area for scatter to cross sectional area for reaction ($A_x/A_r$), the amount of energy that must be invested in all ions whether they react or are lost for a given set of conditions ($E_i$) and the resulting power amplification factor corresponding to those conditions of theta and angle of deflection ($P_f$).

TABLE 1

| Theta $\theta$ | Angle of deflection. | Closest approach $d \times 10^{-14}$ | Area of scatter $A_s$ in Barns | Ratio of scatter $A_s/A_r$ | Energy invest. in MEV $E_i$ | Power amp. factor $P_f$ |
|---|---|---|---|---|---|---|
| 89.5 | 1 | 24785 | $1.9 \times 10^9$ | $3.8 \times 10^8$ | | |
| 89 | 2 | 6196 | $1.2 \times 10^8$ | $2.4 \times 10^7$ | | |
| 88 | 4 | 1549 | $7.5 \times 10^6$ | $1.5 \times 10^6$ | | |
| 85 | 10 | 248 | 191,752 | 38,350 | 4218 | .004 |
| 80 | 20 | 62.6 | 11,940 | 2,388 | 262.7 | .067 |
| 75 | 30 | 28 | 2,298 | 459.6 | 50.56 | .348 |
| 70 | 40 | 16.1 | 719 | 143.8 | 15.82 | 1.113 |
| 65 | 50 | 10.6 | 289.9 | 57.98 | 6.38 | 2.75 |
| 60 | 60 | 7.55 | 134.3 | 26.86 | 2.95 | 5.9 |
| 55 | 70 | 5.74 | 69.455 | 13.9 | 2.123 | 8.29 |
| 50 | 80 | 4.57 | 38.5 | 7.7 | .847 | 20.78 |
| 47.5 | 85 | 4.058 | 28.12 | 5.624 | .619 | 28.43 |
| 45 | 90 | 3.77 | 22.326 | 4.465 | .49 | 35.92 |
| 40 | 100 | 3.22 | 13.458 | 2.69 | .297 | 59.26 |
| 35 | 110 | 2.81 | 8.161 | 1.63 | .179 | 98.3 |
| 30 | 120 | 2.52 | 5 | 100% | .11 | 160 |

DETAILED DESCRIPTION OF DRAWINGS

Figure 1

Figure 1:
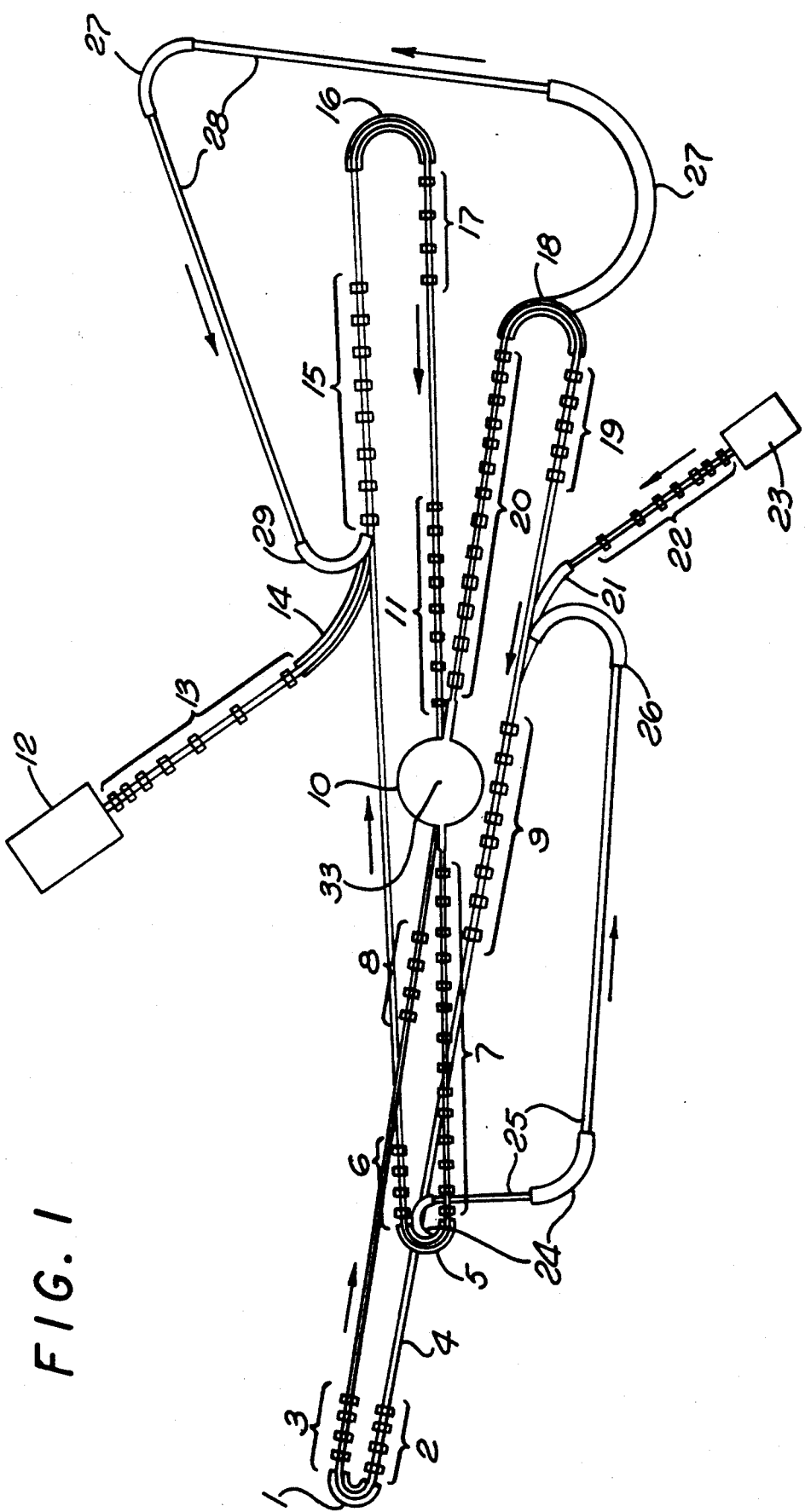
FIG. 1 is a plan view depicting the two intersecting storage rings, the two ion injectors and the reaction chamber, as well as the wrong-way recovery system.

In the illustration of FIG. 1, two ion sources are shown, a tritium source 12, which injects tritium nuclei (tritons), and a deuterium source 23 which injects deuterium nuclei (deuterons). The tritium nuclei are accelerated by the accelerating electrodes 13 and deflected by the tritium injecting magnet 14 which is a bending magnet adapted to redirect newly-injected ions so that their trajectory conforms to that of the ions already circulating in the storage ring. After the tritons are added to those in the ring, all tritons pass through the focusing magnets 15, are deflected 180 degrees by the tritium beam bending magnet 16 and pass through the accelerating electrodes 17 where the triton' speed is adjusted to a selected uniform speed. The tritons then pass through another group of tritium focusing magnets 11 which aims them at the imaginary beam focal point 61 [in FIG. 4] in the reaction chamber 10 where the beams intersect in collision zone 33 [in FIG. 2] they have an opportunity to collide nearly head on with deuterium nuclei in the opposing beam.

Un-reacted, un-scattered tritons exit the reaction chamber and pass through more tritium focusing magnets and accelerating electrodes 7 where their trajectory is again corrected, then pass the tritium beam bending magnet 5 and more accelerating electrodes 6 where they are re-bunched, after which they recirculate through the focusing magnets 15 preparing them for another pass through the reaction chamber 10. The focusing magnets are adjusted to cause the beam intersection point 33 to occur at the beam focal point 61. The tritium ions, once introduced into the storage ring will continue to circulate in this manner until they either react with deuterium or are scattered beyond recapture. Likewise, deuterium ions produced by the deuterium source 23 are accelerated by accelerating electrodes 22, are deflected by the deuterium injecting magnet 21 and enter the deuterium storage ring joining those already present. They then pass through focusing magnets 9, accelerating electrodes 2, the deuterium beam bending magnet 1, more focusing magnets 3 and 8, and into the reaction chamber 10. From there they exit through more deuterium focusing magnets and accelerating electrodes 20, are deflected 180 degrees by the deuterium bending magnet 18, pass through accelerating electrodes 19 and circulate until they either react or are scattered beyond recovery. Deuterium ions are maintained at a speed that is 50% faster than tritium ions so that the momentum of the two will have the same magnitude, but opposite directions. Also depicted is the wrong-way deuterium recovery system 24, 25, 26 and the wrong-way tritium recovery system 27, 28 and 29. Ions which are scattered by more than 90 degrees would be recovered by the internal grids depicted in FIG. 4 but would be directed into the wrong beam pipe. Deuterons would normally pass through the focusing magnets 8, enter the reaction chamber 10 then exit through the deuterium focusing magnets and acceleration electrodes 20. If however, they were deflected by more than 90 degrees by the collision inside the reaction chamber 10, then they would still be recovered by the internal grids depicted in FIG. 4 but they would exit instead through the tritium focusing magnets and accelerating electrodes 7 which would adjust their speed to match that of the tritium ions that belong in the tritium beam. They would then have their trajectories bent by the tritium beam bending magnet 5.

Since deuterons are lighter than tritons, their trajectory is bent more than that of the tritons when they enter the tritium bending magnet 5 at the same speed as tritons. Ref. 4 pp. 577-579. This causes them to enter the wrong-way deuterium beam bending magnets 24 and travel through the wrong-way deuterium recovery pipe 25 to the wrong-way deuterium re-injecting magnet 26 where they are reinjected into the deuterium storage ring. The wrong-way deuterium re-injecting magnet 26 is similar in both design and in function to the deuterium injecting magnet 21 in that it also bends the reinjected beam of deuterons so that their trajectory matches that of the beam already in the storage ring. Similarly, tritons normally pass through the tritium focusing magnets 11, enter the reaction chamber 10 and exit through the tritium focusing magnets and accelerating electrodes 7. However, if their angle of scatter exceeds 90 degrees, they will still be recovered by the internal grids depicted in FIG. 4 but will exit through the deuterium focusing magnets and accelerating electrodes 20 and will enter the deuterium bending magnet 18. Because tritons are heavier than deuterons, their trajectories are bent less than deuterons when traveling at the same speed and subjected to the magnetic force of the deuterium beam bending magnet 18. Ref. 4 pp. 577-579. This causes them to enter the, tritium beam bending magnets 27, travel through the wrong-way tritium recovery pipe 28 to the wrong-way tritium re-injection bending magnet 29.

Figure 2

Figure 2:
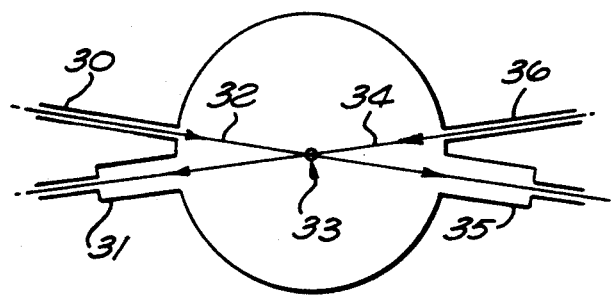
FIG. 2 is a sectioned plan view of the reaction chamber.

FIG. 2 is a sectioned plan view of the reaction chamber 10 showing the tritium beam entrance pipe 36, the trajectory 34 of the tritium ions, the deuterium beam entrance pipe 30, the trajectory 32 of the deuterium ions; the beam intersection point in the collision zone 33 where the deuterium and tritium ions have opportunities to collide and react, larger tritium exit pipe 31, and larger deuterium exit pipe 35.

Figure 3

Figure 3:
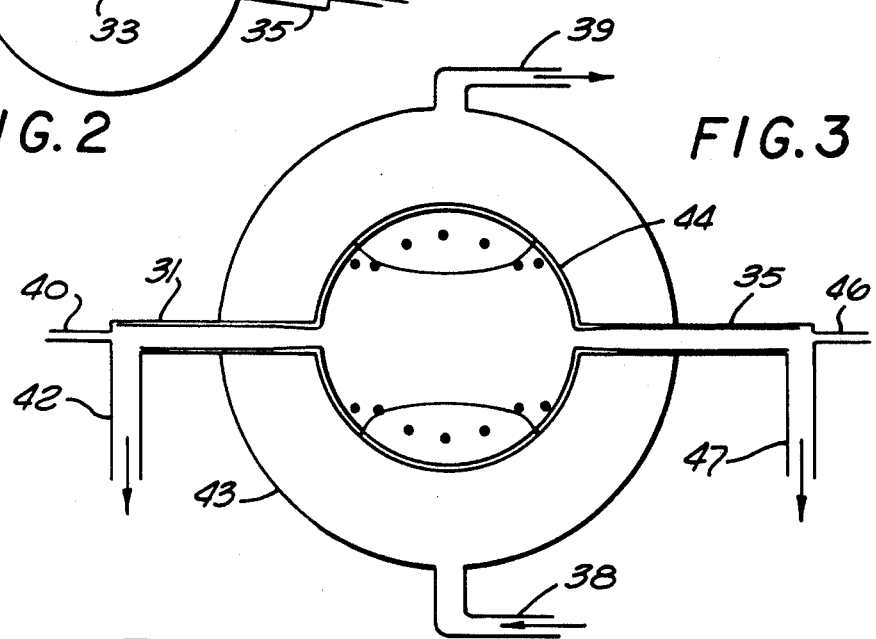
FIG. 3 is an elevation section view showing the reaction chamber as well as the lithium blanket chamber and the vacuum pump connections.

FIG. 3 is a sectioned elevation view of the reaction chamber 10 showing larger tritium exit beam pipe 31 leading to smaller tritium beam pipe 40, and larger deuterium exit beam pipe 35 leading to smaller deuterium beam pipe 46. Also shown are the vacuum pump connections 42 and 47, the inner chamber wall 44 in reaction chamber 10 and the outer containment vessel 43 for the lithium blanket. The space between outer containment vessel 43 and inner chamber wall 44 forms the blanket chamber through which is circulated a blanket of liquid lithium sufficiently thick to stop all He4 nuclei and all fast neutrons produced in the reaction chamber. The liquid lithium is pumped into the blanket chamber through lithium entry pipe 38 and out through lithium exit pipe 39. The exiting lithium, which has absorbed fusion-produced energy, is cooled by passage through the power plant boiler, not depicted, where high pressure superheated steam is produced. The steam drives a steam turbine, not depicted, to produce electricity. The cooled lithium recirculates into the blanket chamber through lithium entry pipe 38. The smaller tritium and deuterium beam entrance pipes 36 and 30 are hidden behind the exit pipes 31 and 35 in this view.

Figure 4.

Figure 4:
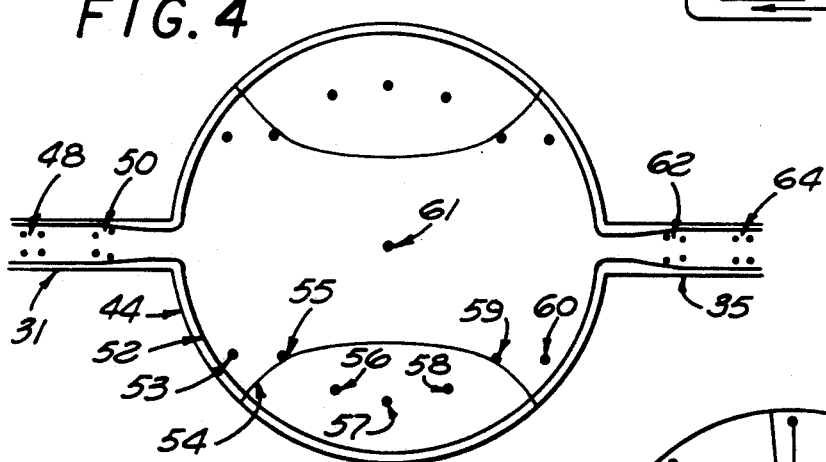
FIG. 4 is an expanded elevation view of the interior of the reaction chamber showing the scattered-ion recovery grids and the inner wall grid for suppressing thermionic emissions.

FIG. 4 is a more detailed schematic sectioned elevation view of the reaction chamber 10 showing the locations of internal grids 48, 50, 53, 55, 56, 57, 58, 59, 60, 62 and 64 which are circular and are centered on the beam exit pipes 31 and 35. Since this is a sectioned elevation view, only the bottom portion of the grid is identified with arrows. It is to be understood that each grid so identified by an arrow encircles the inner wall of the reaction chamber in a plane that is at right angle to this view and passes through the plane of this view again at the top of the illustration, so the trace of each of these grids is shown in two places in this view. The same is true of the grids shown in the beam pipes. Grids shown as lines, 52 and 54 are routed along the inside of the reaction chamber in the same plane as this view. Grid 52 consists of 10 conductors, depicted in FIG. 5 spaced approximately equally around the inside of the reaction chamber and the beam pipes. This will help suppress thermionic emissions from the inner chamber wall 44 of the reaction chamber 10 as well as provide a reference voltage for intermediate grids 53 and 60 which are adapted to recapture scattered ions. Grid 52 is maintained at about 200 volts negative with respect to ground. Grid 54 also consists of 10 conductors, depicted in FIG. 5, and is maintained at the same negative potential as grid 52. All grids are built from small diameter thin wall metal tubing through which liquid metal coolant is circulated. The heat removed is rejected to the environment along with other waste heat, since the temperature of the grids must be kept lower than that required to produce steam for the turbine. Beam focal point 61 is the imaginary point in the center of the chamber 10 upon which are focused the opposing deuterium and tritium beams so the beams will intersect, producing collisions, reactions, and scattering of near misses. Most beam particles will fail to collide and will be deflected by less than 10 degrees and thus will enter the beam exit pipes 31 and 35, experiencing little or no need for redirection by any of the grids inside the reaction chamber. They then will be re-focused by the beam pipe focusing grids 48, 50, 62 and 64 and pass into the storage rings shown in FIG. 1. Ions which are deflected by more than 10 degrees but less than 40 degrees have their trajectories bent by the grids 53, 55, 59 and 60. Grids 55 and 59 are at the same negative potential as are grids 52 and 54. Grids 53 and 60 are maintained at a positive potential. This creates an electrostatic lens which serves to redirect these ions into the beam exit pipes where they pass by the beam pipe focusing grids. Positive grids 53 and 60 are located beyond the end of the inner reference grids 55 and 59, and are adapted to refocus ions deflected by less than 40 degrees back into the recirculating beams. In this case, grids 52, 53, and 55 form a unipotential electrostatic lens on the left side of FIG. 4 with grids 52 and 55 forming the reference and grid 53 the positive focusing grid. On the right side of the reaction chamber, grids 59, 60 and 52 form another unipotential lens, with 59 and 52 being the reference and 60 the positive focusing grid. As Ref. 7 pp. 94 and 98 indicates, electrostatic lenses of this type are fundamentally analogous to glass converging lenses in a light-optical system. They are therefore adapted to refocus diverging streams of ions. Positive ions deflected by more than 40 degrees are repelled by positive grids 56, 57 and 58. Grid 57 is the most positive at about +60 KV. Grids 56 and 58 are maintained at about +20 KV. Since positive grids 56 and 58 are shielded from the center of the reaction chamber by grid 54, they have no effect on the beams or individual ions deflected by less than about 40 degrees. Since the positively charged ions are repelled most strongly by the most positively charged grid, these grids force the very widely scattered ions toward the beam exit pipes also, resulting in recapture of a higher percentage of the scattered ions and redirection of them into one of the beam exit pipes.

As Ref. 7 pp. 103 indicates, an electrostatic mirror is thus set up which has the same properties as an optical mirror in that it reflects ions like a curved optical mirror. The result is that the positively charged deuterium and tritium ions which are deflected out of the beam paths toward the walls by very wide angles as a result of scatter in the reaction chamber will tend to be repelled by the positively charged grids and redirected toward the chamber exit pipe at an angle sufficiently close to the original beam trajectory that they can be re-integrated into their original beams and re bunched. It is estimated that 70% of the ions deflected by 85 degrees or less will be recaptured.

Figure 5:
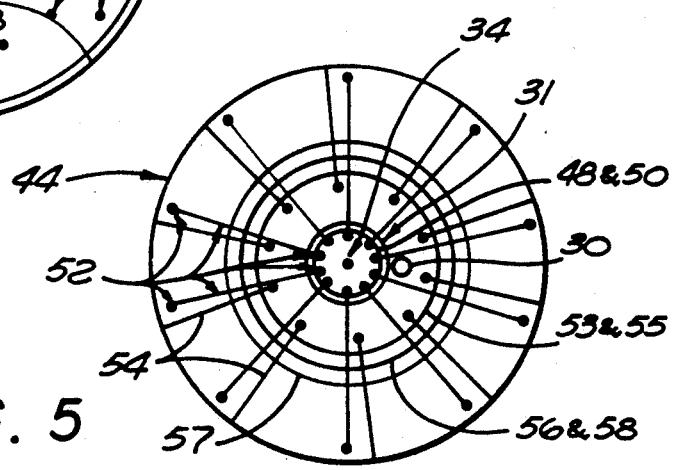
FIG. 5 is an end view of the interior of the reaction chamber in a plane at right angles to FIG. 4 showing the scattered-ion recovery grids and the interior wall grid for suppressing thermionic emissions.

Some of the ions recovered in this manner (those deflected by more than 90 degrees) will be sent into the 'wrong' beam exit pipe, that is, some deuterium ions will enter the tritium beam exit pipe and vice versa. Such 'wrong-way' scatters will diverge from the beam as they enter the first bending magnet because their mass-to-energy ratio differs from that of the 'proper' ions that belong in that pipe. The trajectories of such wrong-way ions therefore will not be bent by the same angle and wrong-way ions will enter the wrong-way ion recovery system depicted in FIG. 1. Some ions will be lost by collisions with the grid 54 since they must pass through the space occupied by it twice to get back into their assigned beam pipe if they were originally deflected by more than 40 degrees. This is a function of the number of ions deflected by at least 40 degrees times the percentage of the surface area covered by the grids. Stainless steel tubing is commercially available in sizes down to 1/16". When grids 54 are built from this size tubing and are arranged equally around the inside of the reaction chamber 10 as shown in FIG. 5, and if the radius of the cylinder formed by the portion of the grid 54 in FIG. 4 between grids 55 and 59, is 15", then the circumference of the cylinder is equal to $15'' \times 2 \times 3.14159 = 94.2477''$. If each grid is built from a 1/16" diameter tube, and there are ten of them arranged equally around the chamber as depicted in FIG. 5, then the total percentage of the cylindrical area blocked by the presence of the tubes is equal to $0.0625 \times 10 / 94.2477$ or 0.66%. The percentage of ions which will be lost as they pass through this cylindrical area is approximately equal to the percentage of area blocked by solid mater in the form of these grids, which is less than 1%. This will result in about 1.43 ions being lost due to collision with the grid structure 54 ( which is the only grid structure which ions will be required to actually pass through ) for each ion which actually reacts.

Figure 5

FIG. 5 is a second end view of the reaction chamber 10 sectioned at right angles to FIG. 4 showing the locations of positive grids 48, 50 located in the tritium beam exit pipe 31, positive grids 53, 56, 57 and 58 inside inner chamber wall 44, deuterium beam entrance pipe 30; the imaginary center of the trajectory 34 of the tritium ions as they leave through the tritium exit pipe 31. Negative grids 52 are evenly spaced around the inside of the inner chamber wall 44. They are routed to the far end of the chamber and into the tritium exit pipe 31 as depicted in FIG. 4. Reference grids 54 protrude from the inner chamber wall 44 as depicted in FIG. 4, and curve toward the beam exit pipes, as illustrated in FIG. 4, to form a quasi-cylindrical area of the reaction chamber which is shielded from positive grids 56, 57 & 58.

Figure 6

Figure 6:
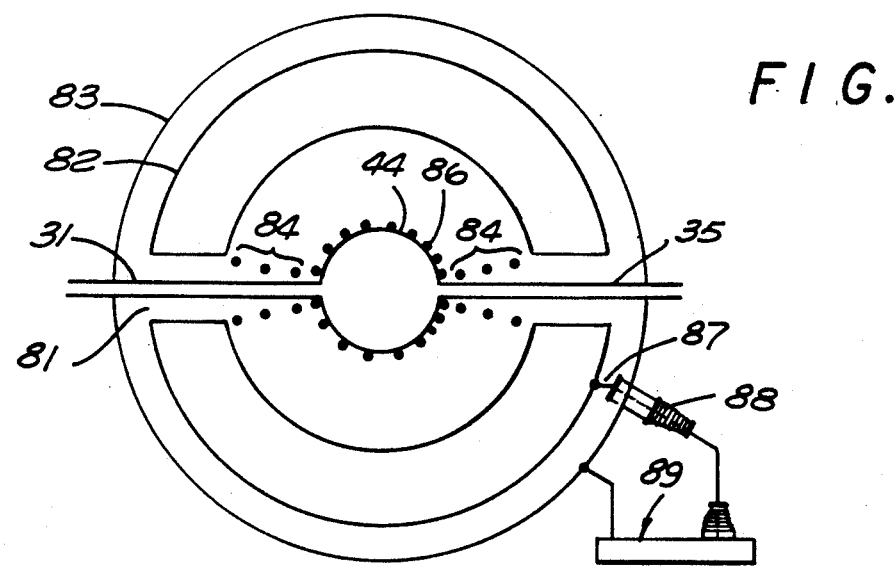
FIG. 6 is an elevation section view which illustrates a method of direct conversion to electric power of kinetic energy from helium particles produced by the fusion reaction.

FIG. 6 is a sectioned elevation view of reaction chamber 10 similar to FIG. 3. FIG. 6 depicts a variant of the reaction chamber 10 illustrating the lithium blanket chamber 82 which is adapted to take advantage of the fact that approximately 20% of the released energy of a deuterium-tritium reaction is kinetic energy of a positively charged particle (He4+). This lithium blanket adaptation converts that energy into electricity as described in Ref 9 pp.553. In this sectioned view, the beam entrance pipes 30 and 36 are hidden behind beam exit pipes 31 and 35 but are close enough to be fitted through the same openings through the lithium blanket chamber 82. The lithium blanket 82 has been moved in this version of the invention. The lithium blanket stops the majority of the products of reaction and most of the heat is produced there. Because it no longer is in contact with the inner chamber wall 44, it no longer is able to cool the inner chamber wall. A thin membrane forms the inner chamber wall 44 of the reaction chamber 10 and cooling tubes 86 surround said inner chamber wall to suppress thermionic emissions. The heat removed by these tubes is rejected to the environment along with other waste heat since the temperature must be kept below that which would be useful to produce steam for the turbine. An outer chamber wall 83 surrounds both the lithium blanket chamber 82 and the inner chamber wall 44. The space inside this chamber 81 is evacuated. A series of positive grids 84 surrounds the beam pipes. The individual grids are maintained at progressively more positive voltage with respect to ground, the closer they are to the lithium blanket chamber 82. Positive grids 84 serve to deflect high energy He4+ions away from the beam pipes 31 and 35 and toward the lithium blanket 82. In the absence of positive grids 84, He4+ ions which pass through the inner chamber wall 44 would interact with the beam exit pipes 31 and 35 and would not do work on the electric field produced by the build up of positive charges in the lithium blanket so that output power would be lost. This would also cause excessive heating of the beam pipes. Liquid lithium is circulated through the lithium blanket chamber 82 which is constructed of suitable metal such as stainless steel or titanium and is electrically insulated from ground. Conductor wire 87 electrically connects lithium blanket chamber 82 through electric feed-through insulator 88 to DC power converter 89 which converts the high voltage DC current at about 1.6 million volts into three phase AC which can be used by the utility grid.

Figure 7

Figure 7:
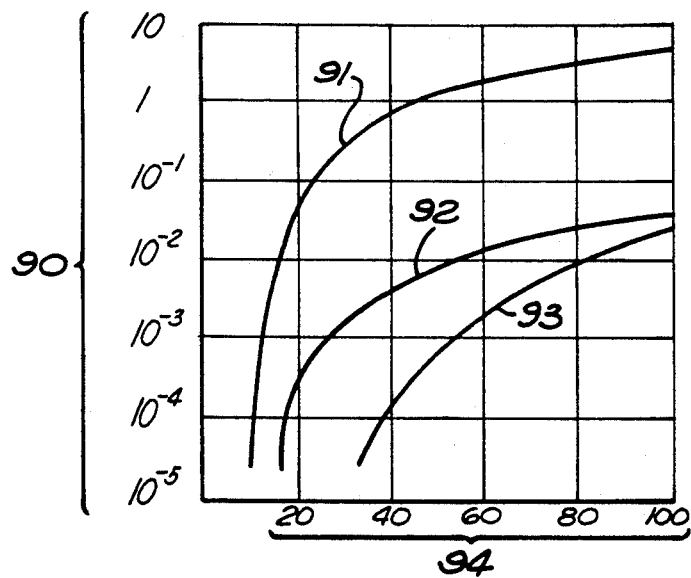
FIG. 7 is a graph from Ref. 1 of cross sections for thermonuclear reactions.

FIG. 7 is a graph of cross sections for thermonuclear reaction versus collision energy from Ref. 1 pp. 721. Horizontal axis 94 is collision energy in thousands of electron volts. Vertical axis 90 is the cross section in barns. One barn is the cross sectional area equal to $10^{-28}$ meters$^2$. Curve 91 is for the deuterium-tritium reaction; curve 92 for the deuterium-deuterium; and curve 93 for the deuterium-helium 3 reaction.

Figure 8

Figure 8:
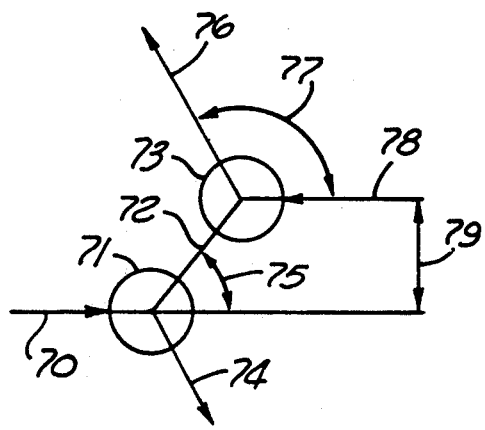
FIG. 8 illustrates a side view of a scattering interaction between deuterium and tritium in the reaction chamber.

FIG. 8 illustrates a scattering interaction between a deuterium ion 71 and a tritium ion 73. It shows the pre-action trajectory 70 and the post-action trajectory 74 of the deuteron and the pre-action trajectory 78 and the post-action trajectory 76 of the triton. It also shows the lateral separation distance 79 between extensions of the pre-action trajectories of the two particles' centers; the closest approach angle 75 between the extension of the pre-action trajectory 70 of the deuteron 71 and a line 72 drawn between the centers of the deuteron and triton at closest approach. It shows the complement angle of deflection 77 between a given particle's pre-action and post-action trajectories (which angle theoretically will have the same magnitude, but opposite directions for the two particles if the pre-action momentum of each particle is equal in magnitude, but opposite in direction. The complement angle of deflection 77 is equal to 180 degrees minus twice the closest approach angle 75.

Figure 9

Figure 9:
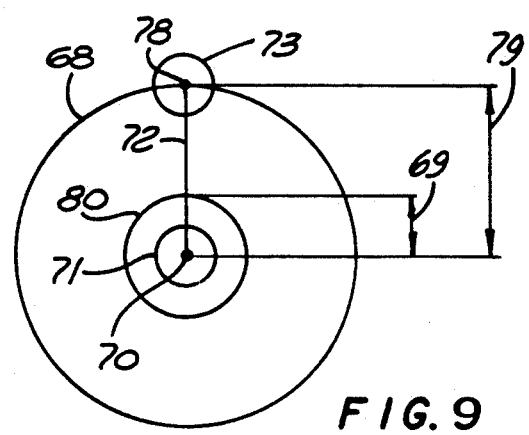
FIG. 9 illustrates an end view of the same scattering interaction between deuterium and tritium in the reaction chamber.

FIG. 9 is an end view of the same scattering interaction as is depicted in FIG. 8. The two drawings should be viewed together. The tritium ion 73 is traveling into the page and the deuterium ion 71 is moving out of the page in FIG. 9. The lateral separation distance 79 appears to be the sam length as the line drawn between the centers of the deuteron and triton at the point of closest approach 72 in this view. However as FIG. 8 illustrates, this is not the case when viewed from the perspective of a side view. For a given lateral separation 79, there is a corresponding angle of closest approach 75 and a corresponding angle of deflection 77, also shown in FIG. 8. For a given lateral separation 79, there is also a specific cross section having outer limit 68. Also depicted in FIG. 9 is the cross section having outer limit 80 for reaction at 110 KEV total incident energy which corresponds to 5 barns, or $5 \times 10^{-28}$ meters$^2$. Equations 1 through 6 specify the values of these parameters and they are tabulated in table 1 for easy reference.

Persons skilled in the art will recognize that the devices described in the drawings and specification can be altered and modified while still employing the conceptions of this invention.

What I claim is:

1. A device for generating and collecting energy from fusion reactions comprising:
    A. intersecting storage rings means adapted to receive and circulate opposing beams of accelerated particles,
    B. reaction chamber means positioned in at least one intersection of said intersecting storage rings means, said reaction chamber means having a collision zone therein and adapted to focus the opposing beams of accelerated particles into said collision zone,
    C. energy collection means distributed about said reaction chamber means for collecting energy released by reactions between colliding accelerated particles, and
    D. recirculation means for receiving particles which have passed through said collision zone without reacting, for adjusting and maintaining particle acceleration, and for re-focusing particles into the collision zone.
    E. thermionic emission suppression means for suppressing thermionic emissions.

2. A device for generating and collecting energy from fusion reactions comprising:
    a. intersecting storage rings means adapted to receive and circulate opposing beams of accelerated particles,
    b. reaction chamber means positioned in at least one intersection of said intersecting storage rings means, said reaction chamber means having a collision zone therein and adapted to focus the opposing beams of accelerated particles into said collision zone,
    c. energy collection means distributed about said reaction chamber means for collecting energy released by reactions between colliding accelerated particles, and
    d. recirculation means for receiving particles which have passed through said collision zone without reacting, for adjusting and maintaining particle acceleration, and for re-focusing particles into the collision zone;
    e. said recirculation means further including scattered-particle recapturing means for intercepting and refocusing into said recirculation means particles which have been scattered in and emerged from the collision zone.

3. A device as stated in claim 2 wherein said scattered-particle recapturing means further comprises:
    electrostatic lenses placed to intercept and divert the trajectories of scattered particles to re-align the trajectories into said recirculation means.

4. A device as stated in claim 2 wherein said scattered-particle recapturing means further comprises:
    electrostatic mirrors placed to intercept and divert the trajectories of scattered particles to re-align the trajectories into said recirculation means.

5. A device as stated in claim 2 wherein said scattered-particle recapturing means further comprises:
    a. electrostatic lenses, and
    b. electrostatic mirrors, said lenses and mirrors being placed to mutually cooperate in the interception to re-align the trajectories into said recirculation means.

6. A device for generating and collecting energy from fusion reactions, adapted to recover wrong-way ions, which are ions that have been scattered in the reaction chamber by an angle greater than 90 degrees from the trajectory of the beam of matching particles, out of which the ions were scattered, said device comprising:
 a. intersecting storage rings means adapted to receive and circulate opposing beams of accelerated particles,
 b. reaction chamber means positioned in at least one intersection of said intersecting storage rings means, said reaction chamber means having a collision zone therein and adapted to focus the opposing beams of accelerated particles into said collision zone,
 c. energy collection means distributed about said reaction chamber means for collecting energy released by reactions between colliding accelerated particles, and
 d. recirculation means for receiving particles which have passed through said collision zone without reacting, for adjusting and maintaining particle acceleration, and for re-focusing particles into the collision zone;
 e. scattered-particle recapturing means for intercepting and refocusing into said recirculation means particles which have been scattered in the collision zone; and
 f. said scattered-particle recapturing means further comprising means for diverting wrong-way ions and reintegrating them into the trajectory of the beam of matching particles, out of which the ions were scattered, in said recirculation means.

7. A method for generating and collecting energy, comprising:
 a. circulating opposing beams of accelerated particles in intersecting storage rings means having a reaction chamber with a collision zone,
 b. colliding the opposing beams of accelerated particles in said collision zone,
 c. collecting energy released by reactions between colliding accelerated particles, and
 d. recovering and recirculating through said collision zone accelerated particles which have passed through said collision zone without reacting; and
 e. said step of recovering and recirculating further including recapturing scattered accelerated particles emerging from the collision zone and re-integrating them into the recirculating beams.

8. A method for generating and collecting fusion energy, adapted to recover wrong-way ions, which are ions that have been scattered in the reaction chamber by an angle greater than 90 degrees from the trajectory of the beam of matching particles, out of which the ions were scattered, said method comprising:
 a. circulating opposing beams of accelerated particles in intersecting storage rings means having a reaction chamber with a collision zone,
 b. colliding the opposing beams of accelerated particles in said collision zone,
 c. collecting energy released by reactions between colliding accelerated particles, and
 d. recovering and recirculating through said collision zone accelerated particles which have passed through said collision zone without reacting; and
 e. said step of recovering and recirculating further including recovering wrong-way ions by diverting them and reintegrating them into the trajectory of the beam of matching particles out of which the ions were scattered.

* * * * *